United States Patent
Sung et al.

(10) Patent No.: US 9,844,077 B1
(45) Date of Patent: Dec. 12, 2017

(54) SECONDARY COMPONENT CARRIER BEAMFORMING

(71) Applicant: Sprint Spectrum LP, Overland Park, KS (US)

(72) Inventors: Sanghoon Sung, Ashburn, VA (US); Udit Thakore, Fairfax, VA (US); Hau Tran, Centerville, VA (US); Tri Duong, Annandale, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 156 days.

(21) Appl. No.: 14/662,398

(22) Filed: Mar. 19, 2015

(51) Int. Cl.
  *H04W 4/00* (2009.01)
  *H04W 74/08* (2009.01)
  *H04W 72/08* (2009.01)
  *H04W 72/04* (2009.01)

(52) U.S. Cl.
  CPC ... *H04W 74/0833* (2013.01); *H04W 72/0493* (2013.01); *H04W 72/08* (2013.01)

(58) Field of Classification Search
  CPC ............ H04B 7/2121; H04B 7/2123; H04J 2203/0069; H04Q 2213/394; H04W 72/04; H04W 72/12; H04W 76/00; H04W 74/0833; H04W 72/08; H04W 72/0493
  USPC .......................................................... 370/329
  See application file for complete search history.

(56) References Cited

U.S. PATENT DOCUMENTS

| | | | | |
|---|---|---|---|---|
| 6,501,747 B1* | 12/2002 | Friedlander | .......... | H04B 7/0615 370/342 |
| 8,238,832 B1* | 8/2012 | Zhou | .................... | H04B 7/0408 455/41.2 |
| 8,737,513 B2 | 5/2014 | Sun et al. | | |
| 9,609,527 B1* | 3/2017 | Tailor | .................... | H04W 16/28 |
| 2001/0003443 A1* | 6/2001 | Velazquez | .............. | G01S 19/06 342/367 |
| 2002/0065664 A1* | 5/2002 | Witzgall | .............. | G06K 9/0057 704/500 |
| 2003/0048760 A1* | 3/2003 | Park | ...................... | H04B 7/0617 370/295 |
| 2003/0114195 A1* | 6/2003 | Chitrapu | ................. | H01Q 1/246 455/562.1 |
| 2005/0250564 A1* | 11/2005 | Kishigami | ............. | H04B 7/086 455/575.7 |
| 2006/0244660 A1* | 11/2006 | Ann | .......................... | G01S 3/74 342/377 |
| 2008/0080634 A1* | 4/2008 | Kotecha | ............... | H04B 7/0417 375/267 |
| 2012/0182429 A1* | 7/2012 | Forutanpour | .......... | H04R 3/005 348/175 |
| 2013/0315328 A1* | 11/2013 | Liu | ...................... | H04B 7/0413 375/267 |
| 2014/0003635 A1* | 1/2014 | Mohammad | ........... | G10K 11/16 381/306 |

(Continued)

*Primary Examiner* — Robert Lopata (57) ABSTRACT

A method of operating a communication system includes communicating data between an access node and a wireless device using carrier aggregation. This carrier aggregation includes communicating using at least a primary carrier and a secondary carrier. The communication system determines that conditions for the secondary carrier meet a beamforming requirement criteria. The communication system determines an angle of arrival of the primary carrier. Based on the angle of arrival determined for the primary carrier, beamforming is applied to the secondary carrier.

20 Claims, 7 Drawing Sheets

(56) References Cited

U.S. PATENT DOCUMENTS

| | | | | |
|---|---|---|---|---|
| 2014/0094164 A1* | 4/2014 | Hwang | ................ | H04B 7/0634 |
| | | | | 455/423 |
| 2014/0187171 A1* | 7/2014 | Xiao | .................... | H04B 7/0617 |
| | | | | 455/67.11 |
| 2014/0206367 A1* | 7/2014 | Agee | ................. | H04W 28/0236 |
| | | | | 455/450 |
| 2015/0049826 A1* | 2/2015 | Liu | ...................... | H04B 7/0617 |
| | | | | 375/267 |
| 2015/0222345 A1* | 8/2015 | Chapman | ............. | H04B 7/0617 |
| | | | | 370/332 |
| 2015/0365143 A1* | 12/2015 | Chai | .................... | H04B 17/104 |
| | | | | 455/101 |
| 2016/0088648 A1* | 3/2016 | Xue | .................... | H04B 7/0452 |
| | | | | 370/252 |
| 2016/0204920 A1* | 7/2016 | Benjebbour | .......... | H04W 16/28 |
| | | | | 370/329 |
| 2016/0301506 A1* | 10/2016 | Halbauer | ............. | H04B 7/0413 |

* cited by examiner

FIGURE 6 ent carrier and a secondary component carrier for communication with a wireless device. In some examples, conditions for beamforming may be met for the access node and/or wireless device. For example, the wireless device may move to an edge of the coverage area (i.e., minimum usable signal area) for the access node. When this happens, it may be desirable to use beamforming in order to improve the channel quality between the wireless device and the access node. However, when carrier aggregation is also being used, certain air-interface resources typically used to determine beamforming parameters may not be available on the secondary component carrier. For example, an allocation of sounding reference signals (i.e., sounding reference signal, or SRS, resource blocks) may not be available or allocable on the secondary component carrier. This may be a result of the wireless device not supporting uplink carrier aggregation. In these cases, it may not be possible to directly calculate beamforming weights or other parameters from measurements of the secondary component carrier.

SECONDARY COMPONENT CARRIER BEAMFORMING

TECHNICAL BACKGROUND

Very high data rates require large transmission bandwidths. The required transmission bandwidth for some applications or deployments can exceed the transmission bandwidth that is supplied by a single carrier or channel. In order to support these data rates, carrier aggregation, (CA, or sometimes channel aggregation) may be used. Using carrier aggregation, it is possible to utilize more than one carrier and thereby increase the overall transmission bandwidth available for very high data rate communication. These channels or carriers may be in contiguous elements of the spectrum, or they may be in different bands.

Overview

In an embodiment, a method of operating a communication system includes communicating data between an access node and a wireless device using carrier aggregation. The carrier aggregation includes communicating using at least a primary carrier and a secondary carrier. The communication system determines that conditions for the secondary carrier meet a beamforming requirement criteria. The communication system determines an angle of arrival of the primary carrier. Based on the angle of arrival determined for the primary carrier, beamforming is applied to the secondary carrier.

In an embodiment, a communication system comprises a primary access node, a secondary access node, and a processor. The primary access node and the secondary access node are configured to communicate data with a wireless device using carrier aggregation using primary and secondary component carriers, respectively. The primary access node is configurable to determine the angle of arrival of the primary carrier from the wireless device. The secondary access node is configurable to apply beamforming to the secondary carrier. The processor determines that certain conditions associated with the secondary access node meeting beamforming criteria are met. In response to determining that conditions associated with the secondary access node meet the beamforming criteria, the secondary access node is configured to apply beamforming to the secondary access node based on the angle of arrival of the primary carrier from the wireless device, as determined by the primary access node.

However, in an embodiment, the communication system has available air-interface reference signal resources available on the primary component carrier. Thus, the access node for the primary component carrier is able to determine the angle of arrival (and/or channel response) of the primary component carrier. The angle of arrival (and/or channel response) can be determined from reference signals transmitted by the wireless device on the primary component carrier. This angle of arrival of the primary component carrier may then be used to calculate beamforming weights that are applied to beamform the secondary component carrier. In other words, when SRS resources on the secondary component carrier are unavailable (either due to limitation of the wireless device or the access node), reference signals on the primary component carrier are used as the basis for beamforming the secondary component carrier—regardless of whether beamforming is being used on the primary carrier.

Figure 1:
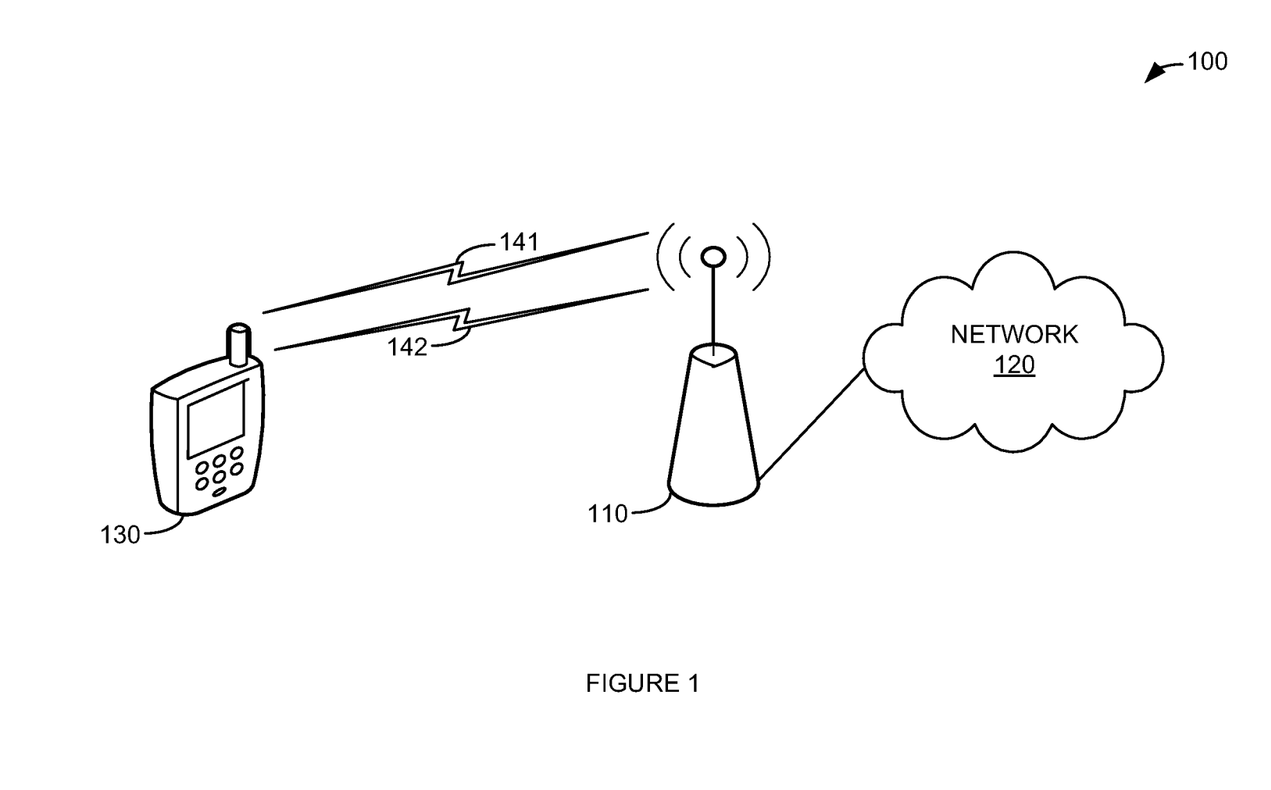
FIG. 1 is a block diagram of a communication system.

FIG. 1 is a block diagram of a communication system. In FIG. 1, communication system 100 comprises access node 110, communication network 120, and wireless device 130. Access node 110 is operatively coupled to network 120. Wireless device 130 is operatively coupled to access node 110 via wireless link 141. Wireless device 130 is operatively coupled to access node 110 via wireless link 142. In an embodiment, access node 110 uses carrier aggregation to communicate with wireless device 130 via a primary component carrier (e.g., wireless link 141) and a secondary component carrier (e.g., wireless link 142.)

Access node 110 is a network node capable of providing wireless communication to wireless device 130. Access node 110 can be, for example, one or more of a base transceiver station, a radio base station, an eNodeB device, or an enhanced eNodeB device. Access node 110 communicates with wireless device 130 via wireless link 141 using a primary component carrier and via wireless link 142 using a secondary component carrier.

DETAILED DESCRIPTION

In an embodiment, an access node may be using carrier aggregation to communicate with a wireless device. For example, an access node may use a primary component Communication system 100 is a communication network that can provide wireless communication to wireless device 130. Communication system 100 and network 120 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 and network 120 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140, and/or wireless link 141 can be a radio frequency, microwave, infrared, or other similar signal. Wireless link 140, and/or wireless link 141 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 (and present in network 120, in particular) to facilitate wireless communication to/from wireless device 130 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130 may be any device, system, combination of devices, or other such communication platform capable of communicating wirelessly with access node 110 using wireless link 141 and wireless link 142. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110 using wireless link 141 and wireless link 142. Other types of communication platforms are possible.

Although only access node 110 is illustrated in FIG. 1, wireless device 130 (and other wireless devices not depicted) can be in communication with a plurality of access nodes and/or small cells. The plurality of access nodes and/or small cells can be associated with different networks and can support different communication protocols and radio access technologies.

In an embodiment, communication between access node 110 and wireless device 130 can be performed using carrier aggregation. This carrier aggregation is performed using at least the primary component carrier of wireless link 141 and a secondary component carrier of wireless link 142. Carrier aggregation using additional wireless links (not shown in FIG. 1) using additional component carriers may also be used.

Communication system 100 can determine that certain conditions associated with the secondary component carrier of wireless link 142 meet one or more beamforming conditions. These beamforming conditions may be based on downlink received signal properties associated with wireless link 142. These indicators of downlink received signal properties may include, for example, a channel quality indicator (CQI), received signal strength (RSSI), reference signal received power (RSRP), and/or signal to interference and noise ratio (SINR). These indicators may be based on downlink reference signals transmitted by access node 110. Wireless device 130 may report these indicators of downlink received signal properties to access node 110. The indicators of downlink received signal properties may be reported by wireless device 130 to access node 110 via wireless link 141 and/or wireless link 142.

Another beamforming condition can be the availability of a reference signal allocation on the primary component carrier of wireless link 141. The beamforming condition can be the availability of uplink air-interface sounding reference signal resources (e.g., SRS resource blocks allocatable to wireless device 130) to be transmitted by wireless device 130 to access node 110 via wireless link 141 (i.e., primary component carrier.)

Based on the beamforming criteria being met, wireless device 130 is configured by communication system 100 to provide reference signals (e.g., sounding reference signals) on the primary component carrier of wireless link 141. These sounding reference signal received from wireless device 130 via wireless link 141 may be used by communication system 100 (and access node 110, in particular) to determine the angle of arrival, at access node 110, of the primary component carrier used by wireless link 141. This angle of arrival is used to determine beamforming weights to be used by access node 110 on the secondary component carrier used by wireless link 142. Angle of arrival (or similarly direction of arrival) based beamforming is a transmission technique that forms one or more narrow beam-widths by aligning beam main-lobes to the determined angle of arrival.

The calculated beamforming weights to be used by access node 110 on the secondary component carrier are used to apply beamforming to the secondary component carrier used by the wireless link 142. In other words, the angle of arrival determined for the primary component carrier of wireless link 141 is used as the basis for applying beamforming to the secondary component carrier of wireless link 142. In particular, the angle of arrival of the uplink transmissions on the primary component carrier of wireless link 141 is used as the basis for applying beamforming to the downlink transmissions to wireless device 130 on the secondary component carrier (as used by wireless link 142).

Figure 2A:
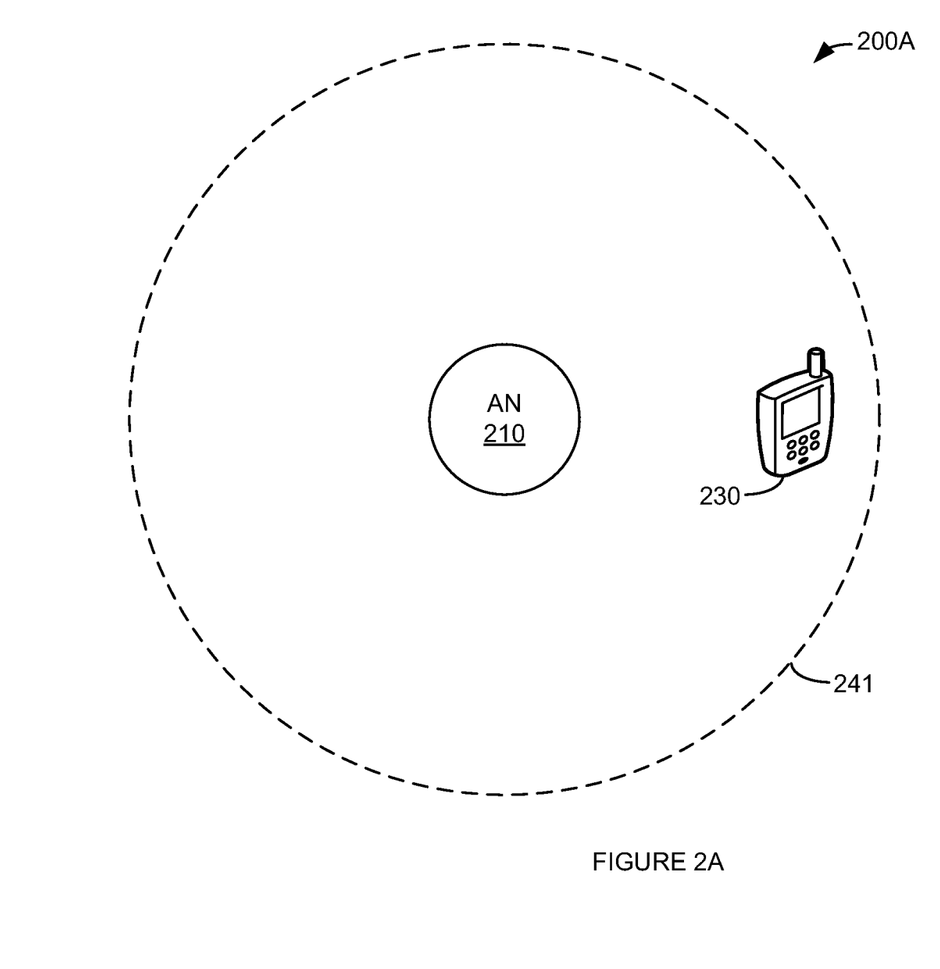
FIGS. 2A and 2B illustrate the operation of a communication system.
Figure 2B:
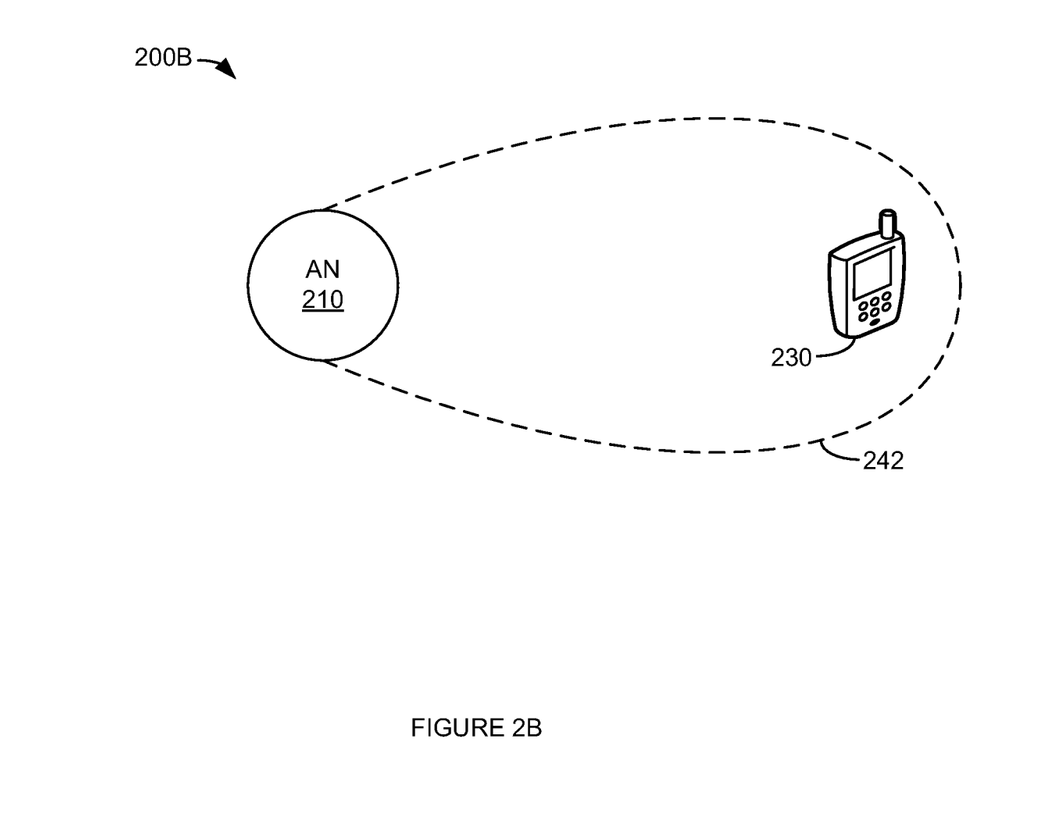

FIGS. 2A and 2B illustrate the operation of a communication system. Systems 200A and 200B comprise wireless device 230, access node 210, signal area 241, and adjusted signal beam 242. Wireless device 230 may comprise a device similar to wireless device 130. Access node 210 may comprise an access node similar to access node 110.

In operation, access node 210 may establish communication with wireless device 130 such that access node 210 provides the wireless device access to a communication network (e.g., communication network 120). Signal area 241 may comprise an area around access node 210 where a wireless device may detect wireless signals transmitted from access node 210, on a primary component carrier and/or a secondary component carrier, at a signal level above a threshold. For example, signal area 241 may comprise coverage areas for access node 210, such that wireless devices that fall within signal area 241 may be provided wireless services by the access node 210 using carrier aggregation of a primary component carrier and a secondary component carrier. Signal area 241 may comprise an area around access node 210 where a wireless device may detect wireless signals transmitted on a primary component carrier and/or secondary component carrier from access node 210 at signal level(s) above a threshold. For example, signal area 241 may comprise coverage areas for access node 210, such that wireless devices that fall within the signal area may be provided wireless services by access node 210 using carrier aggregation of a primary component carrier and a secondary component carrier.

In an embodiment, systems 200A and 200B may use a plurality of carriers in order to provide wireless communication services. These carriers may include at least primary component carrier and a secondary component carrier. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, systems 200A and 200B may leverage beamforming on a secondary component carrier to enhance the wireless services provided to wireless device 230 on the secondary component carrier. For example, wireless device 230 may be located at the edge of signal area 241. Accordingly, the wireless device may experience a low channel quality (e.g., a channel quality indicator below a threshold) on the secondary component carrier. The low channel quality may be based on a high interference level for the signals received by wireless device 230, or other suitable factors.

In an embodiment, access node 230 may perform beamforming on the secondary component carrier such that a signal transmitted to wireless device 230 is adjusted based on the location of the wireless device 230. For example, an adjusted beam 242 may be transmitted from access node 210 such that wireless device 230 may experience greater channel quality when communicating with access node 210 using the secondary component carrier. In an embodiment, the adjusted beam 242 may comprise signals transmitted over a secondary component carrier being aggregated with a primary component carrier, where the primary and secondary component carriers have been assigned to wireless device 230 (e.g., assigned as the frequency bands that access node 210 uses to communicate with wireless device 230).

In an embodiment, beamforming on the secondary component carrier may be accomplished using a plurality of antennas at access node 230 that implement, for example, a multiple input multiple output (MIMO) protocol. The signals from each of the plurality of antennas may be controlled such that the net signal from the access node on the secondary component carrier may be transmitted towards wireless device 230 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 230 and destructive interference in other directions (e.g., away from wireless device 230.) System 200B shows access node 210 adjusting a beam emitted by the access node 210 on the secondary component carrier towards wireless device 230. For example, adjusted signal beam 242 may be narrowed towards the location of wireless device 230.

In an embodiment, carrier aggregation is implemented by the systems 200A and 200B. For example, access node 210 communicates with wireless device 230 using carrier aggregation such that the data rate (or throughput) for the communication is greater than the data rate for single carrier communication. In an embodiment, access node 210 may communicate with wireless device 230 using a primary component carrier (e.g., a first frequency band) and one or more secondary component carriers (e.g., one or more secondary frequency bands). For example, a primary channel (e.g., 5 or 10 Mhz channel) and one or more secondary channels may be allocated for communication between access node 210 and wireless device 230, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In an embodiment, access node 210 communicates with wireless device 230 using carrier aggregation. In some instances, conditions for beamforming on the secondary carrier may be met for access node 210 and/or wireless device 230. For example, wireless device 230 may move to an edge of signal area 241. When these conditions are met, in an embodiment, steps may be performed to apply beamforming to the secondary component carrier using signal characteristics (e.g., angle or direction of arrival) associated with the primary component carrier. In this manner, beamforming can be applied to the secondary component carrier without measurements based on uplink reference signals provided by the wireless device 230 on the secondary component carrier.

Figure 3:
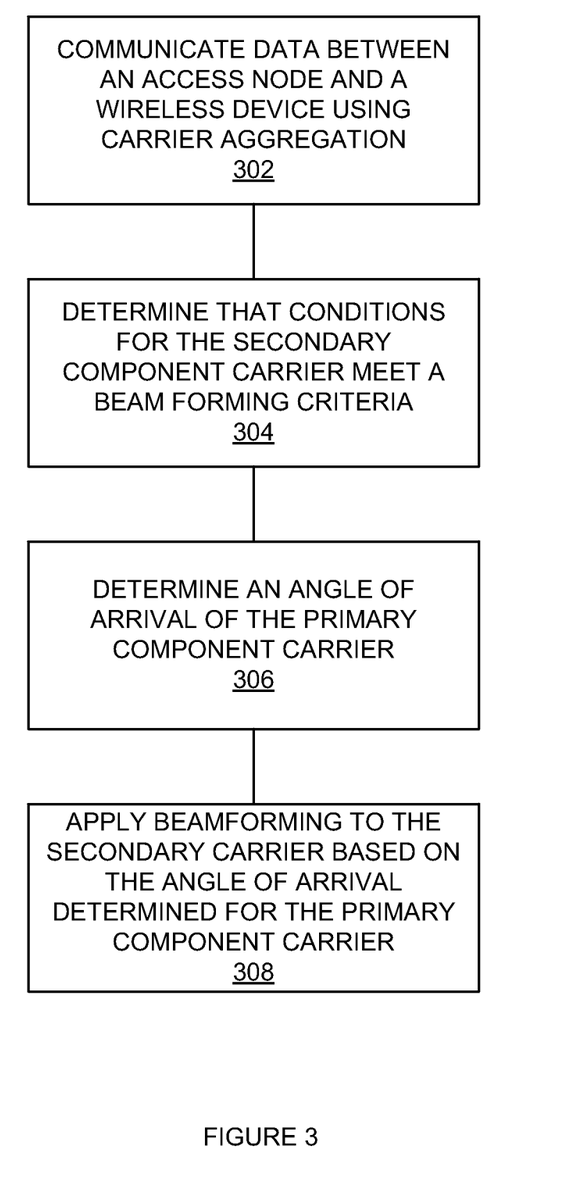
FIG. 3 is a flowchart illustrating a method of operating a communication system.

FIG. 3 is a flowchart illustrating a method of operating a communication system. The steps illustrated in FIG. 3 may be performed by one or more elements of communication system 100, communication system 200A, and/or communication system 200B. Data is communicated between an access node and a wireless device using carrier aggregation (302). For example, access node 110 and wireless device 130 may implement carrier aggregation. Access node 110 communicates with wireless device 130 using carrier aggregation such that the data rate (or throughput) for the communication is greater than the data rate for single carrier communication. Access node 110 may communicate with wireless device 130 using a primary component carrier (e.g., a first frequency band) and one or more secondary component carriers (e.g., one or more secondary frequency bands). In an example, wireless device 130 may be unable to implementing uplink carrier aggregation. In this case, access node 110 and wireless device 130 may only use downlink carrier aggregation such that the downlink data rate (or throughput) for downlink transfers communication is improved over single carrier downlink communication.

Conditions for the secondary component carrier are determined to meet beamforming criteria (304). For example, channel quality indicator(s) and/or resource availability indicators may meet one or more threshold criteria associated with a decision to apply beamforming to the secondary component carrier. Access node 110 or another element (e.g., a processing node) of communication system 100 may receive these channel quality indicator(s) and/or resource availability indicators and determine the threshold criteria associated with the decision to apply beamforming to the secondary component carrier have been met. Example indicators that can be used to determine whether the secondary component carrier meets the beamforming criteria can include, but is not limited to, one or more of a channel quality indicator (CQI), received signal strength (RSSI), reference signal received power (RSRP), and/or signal to interference and noise ratio (SINR). These indicators may be based on downlink reference signals transmitted by access node 110 on the secondary component carrier. Wireless device 130 may report these indicators of downlink received signal properties to access node 110. The indicators of downlink received signal properties may be reported by wireless device 130 to access node 110 via wireless link 141 and/or wireless link 142.

An angle of arrival of the primary component carrier is determined (306). For example, using sounding reference signals transmitted by wireless device 130 on the primary component carrier, communication system 100 (or a processing node therein) may determine an angle of arrival of these transmission from wireless device 130.

Beamforming is applied to the secondary component carrier based on the angle of arrival determined for the primary component carrier (308). For example, access node 110 may apply beamforming to wireless link 142 (which uses the secondary component carrier) based on the angle of arrival of the sounding reference signals received via wireless link 141 (which uses the primary component carrier.) This beamforming may be applied even in situations where beamforming is not being applied to the primary component carrier used by wireless link 141.

Figure 4:
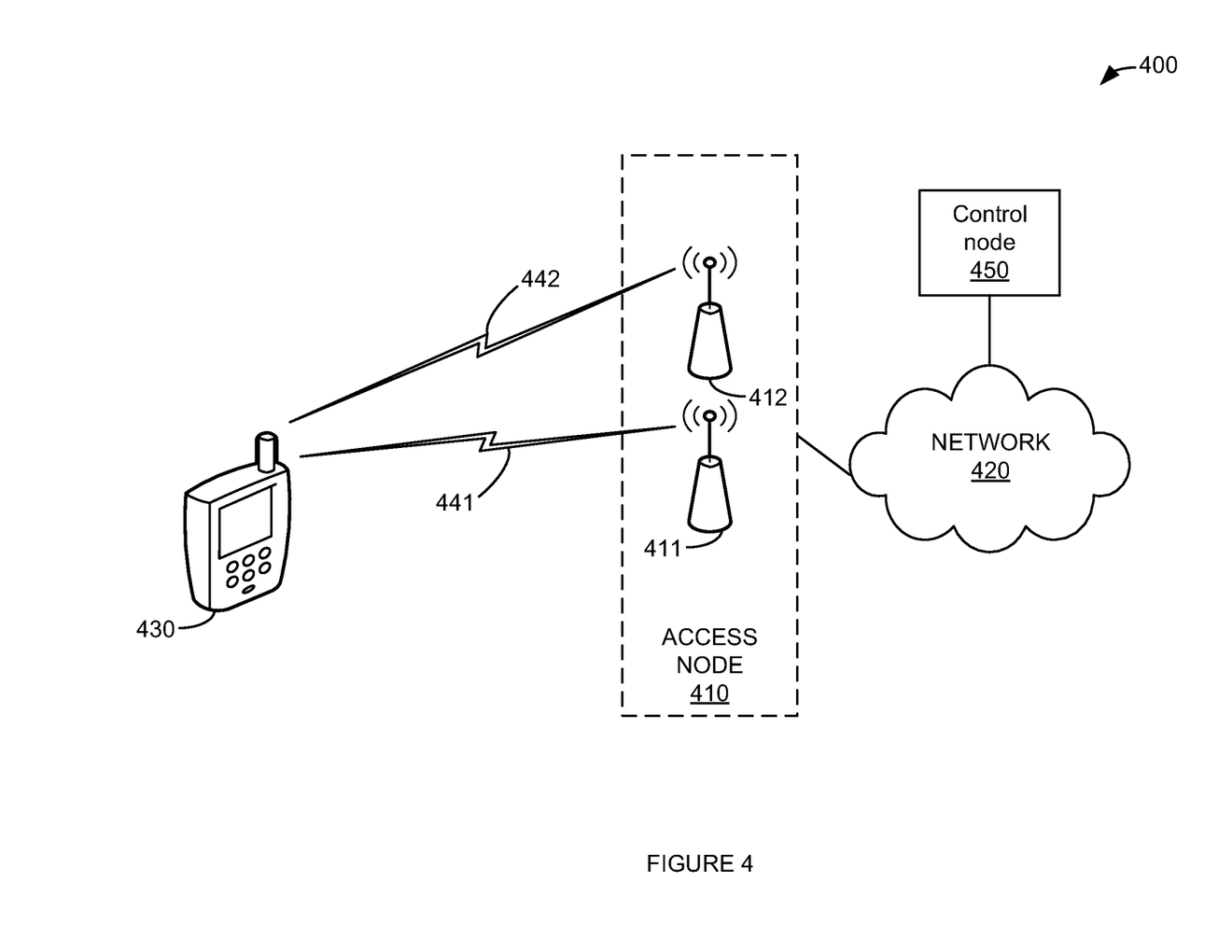
FIG. 4 is a block diagram of a communication system.

FIG. 4 is a block diagram of a communication system. In FIG. 4, communication system 400 comprises access node 410, communication network 420, control node 450, and wireless device 430. Access node 410 includes primary component carrier access node 411 and secondary component carrier access node 412. Access node 410 is operatively coupled to network 420. Control node 450 is operatively coupled to network 420. Thus, control node 450 is operatively coupled to access node 410 via network 420.

Wireless device 430 is operatively coupled to primary component carrier access node 411 via wireless link 441. Wireless device 430 is operatively coupled to secondary component carrier access node 412 via wireless link 442. In an embodiment, access node 410 aggregates the downlink carriers of wireless link 441 and wireless link 442 and to communicate with wireless device 430.

Access node 410 is a network node capable of providing aggregated wireless carrier communication with wireless device 430. Access node 410 can be, for example, one or more of a base transceiver station, a radio base station, an eNodeB device, or an enhanced eNodeB device. Access node 410 communicates with wireless device 430 using primary component carrier access node 411 and secondary component carrier access node 412.

Communication system 400 is a communication network that can provide wireless communication to wireless device 430. Communication system 400 and network 420 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 400 and network 420 can also comprise wireless networks, including base station, wireless communication nodes, telephony switches, internet routers, network gateways, computer systems, communication links, or some other type of communication equipment, and combinations thereof.

Wired network protocols that may be utilized by communication system 400 and/or network 420 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 400 and/or network 420 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 400, can be, for example, twisted pair cable, coaxial cable or fiber optic cable, or combinations thereof. Wireless link 440, and/or wireless link 441 can be a radio frequency, microwave, infrared, or other similar signal. Wireless link 440, and/or wireless link 441 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 (and present in network 420, in particular) to facilitate wireless communication to/from wireless device 430 but are omitted for clarity, such as base stations, base station controllers, gateways, mobile switching centers, dispatch application processors, and location registers such as a home location register or visitor location register. Furthermore, other network elements may be present to facilitate communication between among elements of communication system 400 which are omitted for clarity, including additional processing nodes, routers, gateways, and physical and/or wireless data links for carrying data among the various network elements.

Wireless device 430 may be any device, system, combination of devices, or other such communication platform capable of communicating wirelessly with primary carrier access node 411 using wireless link 441 and secondary carrier access node 412 using wireless link 442. Wireless device 430 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 410 using wireless link 441 and wireless link 442. Other types of communication platforms are possible.

Although only access node 410 and its components are illustrated in FIG. 4, wireless device 430 (and other wireless device not depicted) can be in communication with a plurality of access nodes and/or small cells. The plurality of access nodes and/or small cells can be associated with different networks and can support different communication protocols and radio access technologies.

In an embodiment, communication between access node 410 and wireless device 430 can be performed by aggregating the carriers used by primary component carrier access node 411 and secondary component carrier access node 412. This carrier aggregation is performed using at least primary component carrier access node 411 and secondary component carrier access node 412. Carrier aggregation using additional wireless access nodes and links (not shown in FIG. 1) which use additional component carriers may also be used.

Communication system 400 (and control node 450, in particular) can determine that certain conditions associated with the secondary component carrier of access node 412 meet one or more beamforming conditions. These beamforming conditions may be based on downlink received signal properties associated with wireless link 442. These indicators of downlink received signal properties may include, for example, a channel quality indicator (CQI), received signal strength (RSSI), reference signal received power (RSRP), and/or signal to interference and noise ratio (SINR). These indicators may be based on downlink reference signals transmitted by access node 412. Wireless device 430 may report these indicators of downlink received signal properties to access node 410. The indicators of downlink received signal properties may be reported by wireless device 430 to primary component carrier access node 411 via wireless link 441 and/or secondary component carrier access node 412 via wireless link 442.

Another beamforming condition can be the availability of a reference signal allocation from wireless device 430 to primary component access node 411 on wireless link 441. The beamforming condition can be the availability of uplink air-interface sounding reference signal resources (e.g., SRS resource blocks allocatable to wireless device 430) to be transmitted by wireless device 430 to primary component carrier access node 411 via wireless link 441 (i.e., primary component carrier.)

Based on the beamforming conditions meeting the beamforming criteria, wireless device 430 is configured by communication system 400 (e.g., by control node 450) to provide reference signals (e.g., sounding reference signals) to the primary component carrier access node 411. These sounding reference signal received from wireless device 430 via wireless link 441 may be used by communication system 400 (and access node 410, or control node 450, in particular) to determine the angle of arrival, at primary component carrier access node 411, of the primary component carrier used by wireless link 441. This angle of arrival is used to determine beamforming weights to be used by secondary component carrier access node 412 on the secondary component carrier used by wireless link 442. Angle of arrival (or similarly direction of arrival) based beamforming is a transmission technique that forms one or more narrow beamwidths by aligning beam main-lobes to the determined angle of arrival.

The calculated beamforming weights to be used by secondary component carrier access node 412 on the secondary component carrier are used to apply beamforming to the secondary component carrier used by the wireless link 442. In other words, the angle of arrival at the primary component carrier access node 411 of wireless link 441 is used as the basis of the formed beam transmitted by the secondary component carrier access node 412. In particular, the angle of arrival of the uplink transmissions from wireless device 430 received by the primary component carrier access node 411 is used as the basis for the direction of the beamformed downlink transmissions made by the secondary component carrier access node 412 to wireless device 130.

Figure 5:
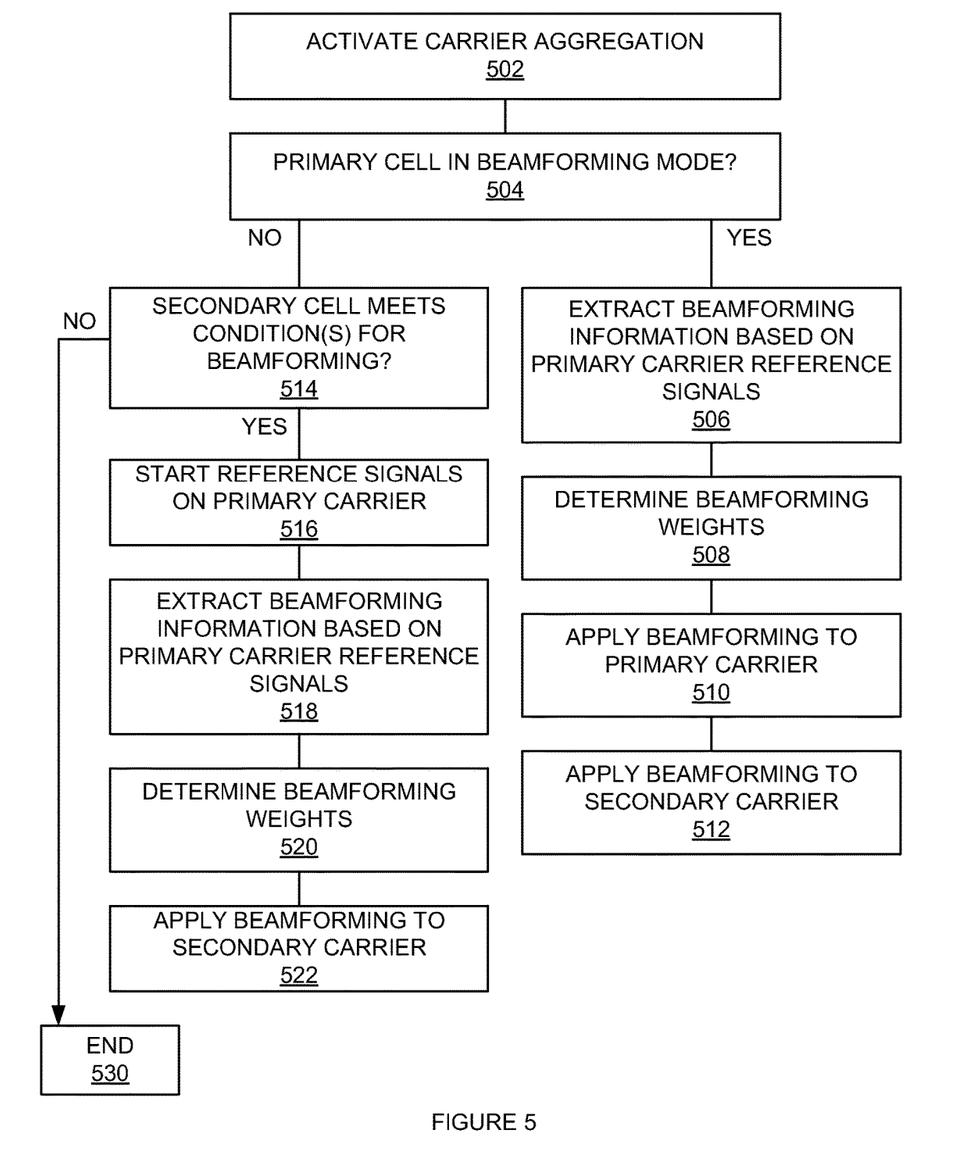
FIG. 5 is a flowchart illustrating a method of operating a communication system.

FIG. 5 is a flowchart illustrating a method of operating a communication system. The steps illustrated in FIG. 5 may be performed by one or more elements of communication system 100, communication system 200A, communication system 200B, and/or communication system 400. Carrier aggregation is activated (502). For example, access node 410 may configure primary component carrier access node 411 and secondary component carrier access node 412 to use a plurality of carriers in order to provide wireless communication services to wireless device 430. Primary component access node 411 and secondary component carrier access node 412 may cooperate with each other such that the data rate (or throughput) for the communication with access node 410 is greater than the data rate for single carrier communication. In an embodiment, primary component carrier access node 411 may communicate with wireless device 430 using a primary component carrier (e.g., a first frequency band). Secondary component carrier access node 412 may communicate with wireless device 430 using one or more secondary component carriers (e.g., one or more secondary frequency bands). In FIG. 5, flow then proceeds to box 504.

It is determined whether the primary cell is in beamforming mode (504). If the primary cell is in beamforming mode, flow proceeds to box 506. If the primary cell is not in beamforming mode, flow proceeds to box 514.

If the primary cell is in beamforming mode, beamforming information is extracted based on the primary carrier's reference signals (506). For example, if primary component carrier access node 411 is configured to use beamforming, the information (e.g., angle of arrival and/or channel response) determined by primary component carrier access node 411 may be received by other elements (e.g., control node 450 and/or secondary carrier access node 412) of communication system 400. In FIG. 5, flow then proceeds to box 508.

Using the extracted beamforming information, beamforming weights are determined (508). For example, the beamforming information extracted from primary component carrier access node 411 can be used determine beamforming weights to be used by primary carrier access node 411 and/or secondary carrier access node 412 in order for primary carrier access node 411 and secondary carrier access node 412, respectively, to form beams directed to wireless device 430. The beamforming information extracted from primary component carrier access node 411 may include the angle of arrival and/or channel response. In an embodiment, the beamforming information used by primary component carrier access node 411 to determine beamforming weights includes, but is not limited to, both the angle of arrival and the channel response. In an embodiment, the beamforming information used by secondary component carrier access node 412 to determine beamforming weights does not include the channel response.

Beamforming is applied to the primary carrier (510). For example, the beamforming weights determined for use by primary component carrier access node 411 may be applied by primary component carrier access node 411 to direct a primary carrier beam at wireless device 430. Beamforming is applied to the secondary carrier (512). For example, the beamforming weights determined for use by secondary component carrier access node 412 may be applied by secondary component carrier access node 412 to direct a secondary carrier beam at wireless device 430.

In FIG. 5, from box 504, if the primary cell is not in beamforming mode, flow proceeds to box 514. It is determined whether the secondary cell meets the condition(s) for beamforming (514). If the secondary cell does not meet the conditions for beamforming, the procedure ends in box 530. If the secondary cell meets the conditions for beamforming, flow proceeds to box 516.

Reference signals are started on the primary carrier (516). For example, primary component carrier access node 411 (in response to a message from control node 450) may instruct wireless device 430 to transmit sounding reference signals. These sounding reference signals may be received by primary component carrier access node 411.

Beamforming information is extracted based on the primary carrier's reference signals (518). For example, information (e.g., angle of arrival and/or channel response) determined from the sounding reference signals by primary component carrier access node 411 may be received by other elements (e.g., control node 450 and/or secondary carrier access node 412) of communication system 400.

Using the extracted beamforming information, beamforming weights are determined (520). For example, the beamforming information extracted from primary component carrier access node 411 can be used determine beamforming weights to be used by secondary carrier access node 412 in order for secondary carrier access node 412, to form a secondary component carrier beam directed to wireless device 430. The beamforming information extracted from primary component carrier access node 411 may include the angle of arrival and/or channel response. In an embodiment, the beamforming information used by secondary component carrier access node 412 to determine beamforming weights does not include the channel response.

Beamforming is applied to the secondary carrier (512). For example, the beamforming weights determined for use by secondary component carrier access node 412 may be applied by secondary component carrier access node 412 to direct a secondary carrier beam at wireless device 430.

The methods, systems, devices, networks, access nodes, processing node, control nodes, and equipment described above may be implemented with, contain, or be executed by one or more computer systems and/or processing nodes. The methods described above may also be stored on a non-transitory computer readable medium. Many of the elements of communication system 100, communication system 200A, communication system 200B, and/or communication system 400 may be, comprise, or include computers systems and/or processing nodes. This includes, but is not limited to: access node 110, access node 210, access node 410, control node 450, wireless device 130, wireless device 230, wireless device 430, network 120, and/or network 420.

Figure 6:
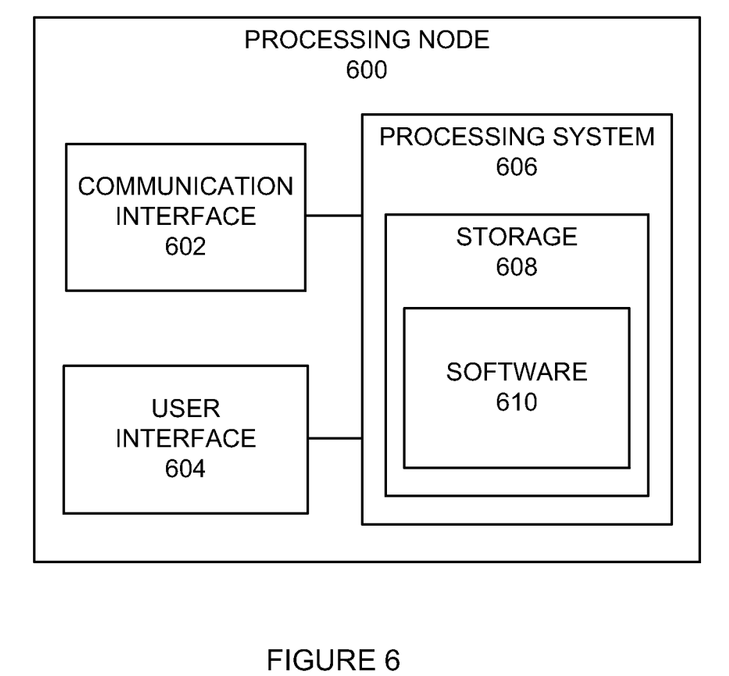
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes control node 450. Processing node 600 can also be an adjunct or component of a network element, such as an element of access node 110, access node 210, access node 410, control node 450, wireless device 130, wireless device 230, wireless device 430, network 120, and/or network 420, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    communicating data between an access node and a wireless device using carrier aggregation, the carrier aggregation including communication performed over at least a primary carrier and a secondary carrier;
    determining that conditions for the secondary carrier meet a beamforming requirement criteria;
    determining an angle of arrival of the primary carrier; and,
    applying beamforming to the secondary carrier based on the angle of arrival determined for the primary carrier.

2. The method of claim 1, further comprising:
    based on the conditions for the secondary carrier meeting the beamforming requirement criteria, configuring the wireless device to provide a reference signal over the primary carrier.

3. The method of claim 2, wherein the angle of arrival of the primary carrier is determined based on the reference signal provided by the wireless device over the primary carrier.

4. The method of claim 1, wherein the conditions for the secondary carrier meeting the beamforming criteria are based on a channel quality indicator reported by the wireless device.

5. The method of claim 1, wherein the conditions for the secondary carrier meeting the beamforming criteria are based on an availability of a reference signal allocation on the primary carrier.

6. The method of claim 1, wherein the conditions for the secondary carrier meeting the beamforming criteria are based on an availability of a reference signal allocation on the secondary carrier.

7. The method of claim 1, wherein the primary carrier is not using beamforming.

8. A communication system, comprising:
a primary access node configured to communicate data with a wireless device using carrier aggregation, the primary access node communicating with the wireless device using a primary carrier, the primary access node configurable to determine an angle of arrival of the primary carrier from the wireless device;
a secondary access node configured to communicate data with the wireless device using carrier aggregation with the primary access node, the secondary access node communicating with the wireless device using a secondary carrier, the secondary access node configurable to apply beamforming to the secondary carrier; and,
a processor configured to:
determine that conditions associated with the secondary access node meet beamforming criteria; and,
in response to determining that conditions associated with the secondary access node meet the beamforming criteria, configure the secondary access node to apply beamforming to the secondary access node based on a determined angle of arrival of the primary carrier from the wireless device, as determined by the primary access node.

9. The communication system of claim 8, wherein the processor is further configured to:
configure the wireless device to provide a reference signal over the primary carrier.

10. The communication system of claim 9, wherein the determined angle of arrival of the primary carrier is calculated based on the reference signal provided by the wireless device over the primary carrier.

11. The communication system of claim 8, wherein the conditions for the secondary carrier meeting the beamforming criteria are based on a channel quality indicator reported by the wireless device.

12. The communication system of claim 8, wherein the conditions for the secondary carrier meeting the beamforming criteria are based on an availability of a reference signal allocation on the primary carrier.

13. The communication system of claim 8, wherein the conditions for the secondary carrier meeting the beamforming criteria are based on an availability of a reference signal allocation on the secondary carrier.

14. The communication system of claim 8, wherein the primary access node is configured to not use beamforming on the primary carrier to communicate with the wireless device.

15. A non-transitory computer readable medium having instructions stored thereon for operating a communication system that, when executed by a computer, at least instruct the communication system to:
communicate data between an access node and a wireless device using carrier aggregation, the carrier aggregation including communication performed over at least a primary carrier and a secondary carrier;
determine that conditions for the secondary carrier meet a beamforming criteria;
determine an angle of arrival of the primary carrier; and,
apply beamforming to the secondary carrier based on the angle of arrival determined for the primary carrier.

16. The computer readable medium of claim 15, wherein the communication system is further instructed to:
based on the conditions for the secondary carrier meeting the beamforming criteria, configure the wireless device to provide a reference signal over the primary carrier.

17. The computer readable medium of claim 16, wherein the angle of arrival of the primary carrier is determined based on the reference signal provided by the wireless device over the primary carrier.

18. The computer readable medium of claim 15, wherein the conditions for the secondary carrier meeting the beamforming criteria are based on a channel quality indicator reported by the wireless device.

19. The computer readable medium of claim 15, wherein the conditions for the secondary carrier meeting the beamforming criteria are based on an availability of a reference signal allocation on the primary carrier.

20. The computer readable medium of claim 15, wherein the conditions for the secondary carrier meeting the beamforming criteria are based on an availability of a reference signal allocation on the secondary carrier.

* * * * *